(12) United States Patent
Permuy et al.

(10) Patent No.: US 6,253,616 B1
(45) Date of Patent: Jul. 3, 2001

(54) METHOD AND SYSTEM FOR DETECTING THE VIBRATION SIGNATURE OF A SAFETY INSERT FITTED IN A TIRE

(75) Inventors: Alfred Permuy, Rueil Malmaison; Laurent Breneol, Paris, both of (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 09/408,484

(22) Filed: Sep. 29, 1999

(30) Foreign Application Priority Data

Oct. 2, 1998 (FR) .................................................. 98 12392

(51) Int. Cl.⁷ .......................... B60C 17/01; B60C 23/00; B60C 23/04; B60C 23/06
(52) U.S. Cl. .............................. 73/579; 73/146; 73/146.2; 152/158; 152/520
(58) Field of Search ........................ 73/579, 146, 146.2; 152/157, 158, 520, 518, 516, 517

(56) References Cited

U.S. PATENT DOCUMENTS

| 4,153,095 | * | 5/1979 | Sarkissian | ............................. | 152/340 |
| 4,157,726 | | 6/1979 | Brewer | ............................. | 152/330 RF |
| 4,262,724 | | 4/1981 | Sarkissian | ........................ | 152/330 RF |
| 5,186,771 | * | 2/1993 | Carpentier et al. | ................... | 152/158 |
| 5,435,636 | * | 7/1995 | Pender | ................................ | 152/158 |
| 5,596,141 | | 1/1997 | Nishikawa et al. | ................. | 73/146.2 |
| 6,039,099 | * | 3/2000 | Muhlhoff | ............................. | 152/158 |

FOREIGN PATENT DOCUMENTS

| 0 421 065 | | 4/1991 | (EP) . | | |
| 0 695 653 | | 7/1996 | (EP) . | | |
| 0 844 111 A1 | * | 5/1998 | (EP) | ..................................... | 152/158 |
| 2762260 A1 | * | 10/1998 | (FR) | ..................................... | 152/520 |
| 5-65004 | * | 3/1993 | (JP) | ..................................... | 152/520 |
| 94 03338 | | 2/1994 | (WO) . | | |

OTHER PUBLICATIONS

French Search Report dated Jun. 23, 1999.

* cited by examiner

Primary Examiner—Hezron Williams
Assistant Examiner—Rose M. Miller
(74) Attorney, Agent, or Firm—Morgan & Finnegan LLP

(57) ABSTRACT

A method for detecting vibrations generated by the running of a tire on a safety insert, wherein a vibration signal is measured within a given frequency band and the measurement thus made is processed to detect a mode of resonance generated by this running. The energy of the signal measured by a sensor in two frequency bands, one being narrow and the other being wide, which are centered on the same line of the mode of resonance, is determined. The ratio of these two energies is compared with a given warning threshold.

25 Claims, 1 Drawing Sheet

METHOD AND SYSTEM FOR DETECTING THE VIBRATION SIGNATURE OF A SAFETY INSERT FITTED IN A TIRE

FIELD OF THE INVENTION

The present invention relates to the detection of the vibration signature of a safety insert fitted in a tire.

BACKGROUND OF THE INVENTION

Tires have been fitted with safety inserts which support the tires when there is a puncture or a serious loss of pressure.

However, the life of such a safety insert is limited, and it is therefore generally necessary to provide means for warning the driver of the occurrence of an incident in one of the tires of his vehicle.

A first solution, known in particular from patent application WO94/03338, consists in using systems for detecting one or more modes of resonance characteristic of running of a tire supported by its insert.

A system of this type includes one or more accelerometers, means for filtering the acceleration measurement signals in one or more frequency bands, and processing means which determine from these acceleration measurements characteristic values which are subsequently compared with warning detection thresholds.

Another solution uses safety inserts which include means of voluntarily degrading the vibration behavior of the vehicle during running supported by these inserts. The characteristic vibrations thus generated warn the driver of an abnormal pressure condition in one of his tires, by means of a suitable detection system for example.

In this respect, see U.S. Pat. No. 4,262,724 or U.S. Pat. No. 4,157,726, for example.

Regardless of whether the safety insert does or does not include means for generating a degraded vibration mode, it is desirable that the method used to detect the characteristic signature of running on the safety insert should be capable of allowing for the vibration level of the ground, in order to avoid the triggering of false alarms, particularly when the vehicle is running on rougher roads or tracks.

A first solution for this purpose could consist of determining a characteristic parameter of the vibration level of the ground, for example from acceleration measurements in certain frequency bands, and making the warning detection threshold or thresholds depend on this parameter.

However, a method of this kind would clearly require considerable computing power.

SUMMARY OF THE INVENTION

One object of the invention is to provide a simple detection method which allows for the vibration level of the ground but does not require a large amount of computing power.

According to one aspect of the invention there is provided a method for detecting vibrations generated by the running of a tire on a safety insert, wherein a vibration signal is measured within a given frequency band and the measurement thus made is processed to detect a mode of resonance generated by this running, the energy of the signal measured by a sensor in two frequency bands, one being narrow and the other being wide, which are centered on the same line of the mode of resonance, is determined, and the ratio of these two energies is compared with a given warning threshold.

The ratio between the two energies, one corresponding to a narrow band and the other to a wide band centered on the same frequency, is in fact independent of the ambient noise (in this case, the vibration level of the road).

The proposed method therefore makes it possible to operate independently of the ambient noise, in a particularly simple way.

This method is advantageously complemented by the following features, taken singly or in all their possible combinations:

- to determine the energy of the signal in the two frequency bands, the detected signal is mixed with two periodic signals which are in phase quadrature and whose frequency corresponds to the frequency of the mode of resonance;
- to determine the energy of the signal in the two frequency bands, the method determines the norm of a vector whose two coordinates correspond to the measured signal mixed with two periodic signals which are in phase quadrature and are integrated during a period equal to twice the reciprocal of the width of this frequency band;
- the periodic signals are square-wave signals which are at a first level during one half-period and an opposite level during the following half-period;
- the measured vibration signal is sampled and digitized, and is then multiplied with the square-wave signals in phase quadrature, whose frequency corresponds to the frequency of the mode of resonance, which have the value 1 during one half-period and −1 during the following half-period;
- the norm determined is the sum of the absolute values of the coordinates.

According to a second aspect of the invention there is provided a system for detecting vibrations generated by the running of a tire on a safety insert, including a sensor for measuring a vibration signal in a given frequency band and means for processing the measurement from this sensor and detecting a mode of resonance generated by this running, wherein the processing means include means for implementing the processing of the previously cited method.

The processing means advantageously include an 8-bit microcontroller.

They may also include processing means including analog means.

They preferably include an application-specific integrated circuit.

Other features and advantages of the invention will be made clear by the following description. This description is purely illustrative and is not limiting on the invention. It should be read with reference to the attached drawings.

DETAILED DESCRIPTION OF THE PREFERRED EMBODIMENT

Figure 1:
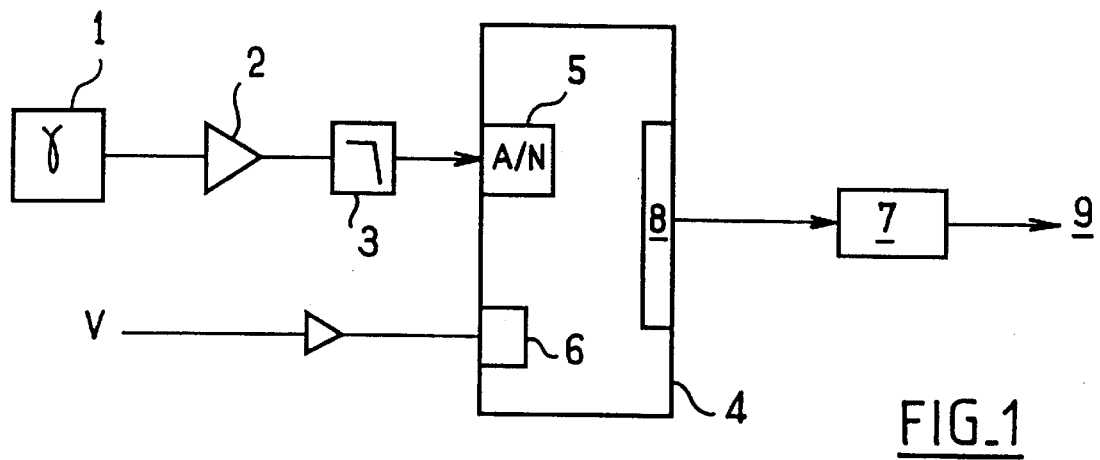
FIG. 1 is a schematic representation of a system constituting one embodiment of the invention.

The detection system illustrated schematically in FIG. 1 includes an accelerometer 1 connected to an analog/digital conversion input 5 of a microcontroller 4 through amplifying means 2 and filtering means 3.

The microcontroller 4 is an 8-bit microcontroller receiving on another input 6 a PWM (Pulse Width Modulation) signal which gives it the wheel rotation frequency of the vehicle and from which it generates a clock signal.

The filtering means are of the low-pass type and have a cut-off frequency of less than 500 Hz.

The system also includes interface means 7 which are connected to one output 8 of the microcontroller 4 and which enable the microcontroller 4 to activate means 9 for generating a warning signal when, on completion of the method, said microcontroller 4 detects the failure of a tire.

The means 9 consist of a light-emitting diode, display means or audible warning means, for example.

The amplified and filtered voltage signal received by the analog converter 5 is sampled by the converter 5 at the clock frequency generated from the signal received at the input 6.

Figure 2:
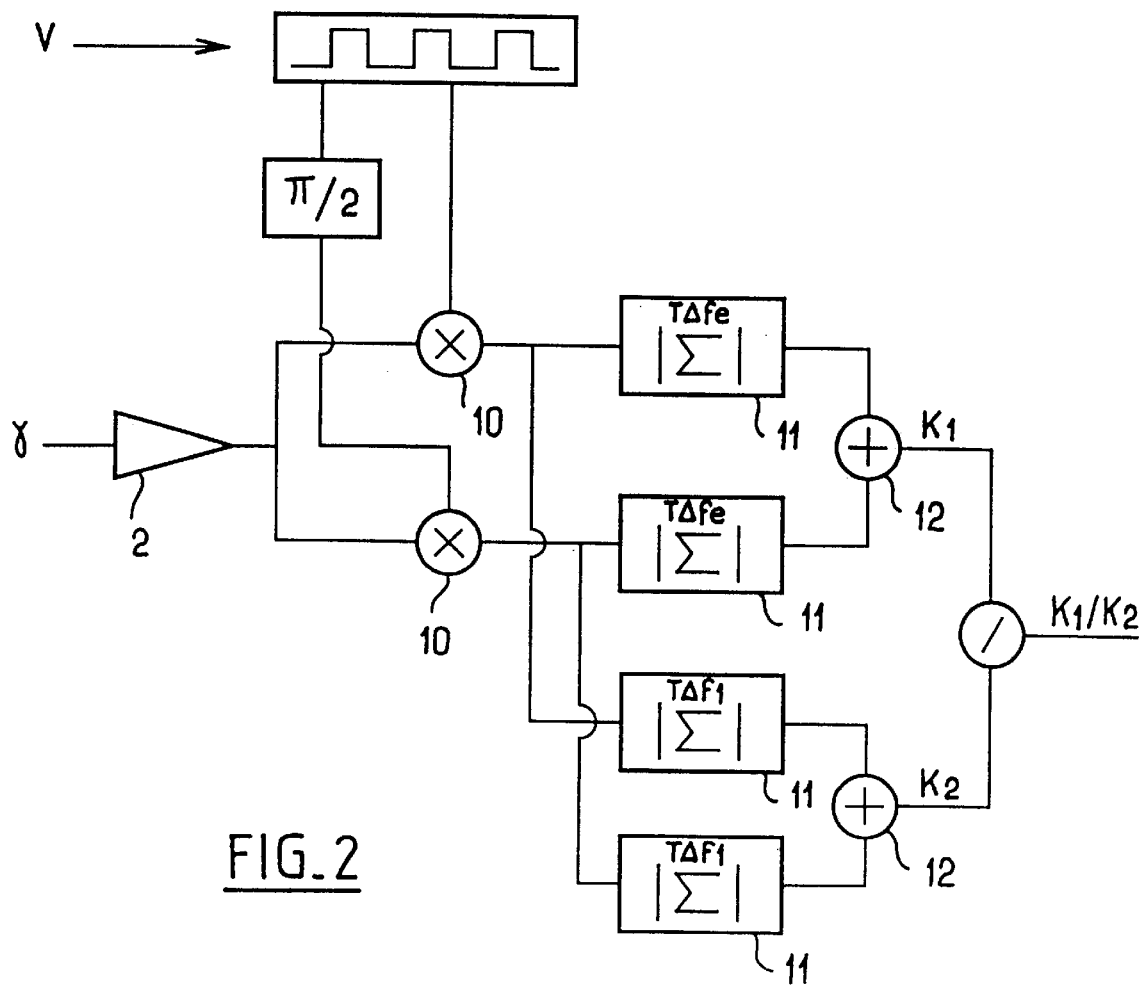
FIG. 2 is a schematic representation illustrating the various stages of a method constituting one embodiment of the invention.

As shown in FIG. 2, the signal sampled in this way is mixed by the microprocessor 4 with a square-wave signal whose frequency is that of the mode of resonance which is to be detected and also with a square-wave signal phase shifted by $\pi/2$ with respect to the first signal (multipliers 10).

These square-wave signals in phase quadrature with which the sampled signal is mixed have a value of 1 during one half-period and −1 during another half-period. They are generated with the clock signal with the aid of standardized timing diagrams stored in the program memory (ROM) of the microcontroller, for example. Their frequency, which is the frequency of the mode of resonance which is to be detected, is equal to twice or six times the wheel rotation frequency of the vehicle, for example.

The values found in this way in each of these two channels are added independently in each of these two channels during a time $T_{\Delta fe}$ and during a time $T_{\Delta fl}$ (stages 11)

The times $T_{\Delta fe}$ and $T_{\Delta fl}$ are temporal analysis periods corresponding to two frequency bandwidths, of which one, $\Delta fe$, contains essentially the desired line, and the other, $\Delta fl$, is wider and incorporates the background noise.

More precisely, the analysis periods $T_{\Delta fe}$ and $T_{\Delta fl}$ are such that $$T_{\Delta fe}=2/\Delta fe$$

and $$T_{\Delta fl}=2/\Delta fl$$

For each of these two frequency bands $\Delta fe$ and $\Delta fl$, the microprocessor 4 adds the absolute values of the sums obtained for each of the two phase-shifted channels (stages 12).

Thus, for the frequency band $\Delta fe$ a parameter K1 defined as follows is obtained:

$$K1 = \left| \sum_{n=0}^{N \cdot t_e <= T \Delta f_e} x(nt_e) \cdot h_k(nt_e) \right| + \left| \sum_{n=0}^{N \cdot t_e <= T \Delta f_e} x(nt_e) \cdot h_k^q(nt_e) \right|$$

and for the band $\Delta fl$ a parameter K2 defined as follows is obtained:

$$K2 = \left| \sum_{n=0}^{N \cdot t_e <= T \Delta fl} x(nt_e) \cdot h_k(nt_e) \right| + \left| \sum_{n=0}^{N \cdot t_e <= T \Delta fl} x(nt_e) \cdot h_k^q(nt_e) \right|$$

It will be noted that determining K1 and K2 by means of the formulae shown above is equivalent to digital calculation of the absolute norm of a vector whose two coordinates correspond to the measured signal mixed with the two signals which are in phase quadrature and integrated over a period equal to twice the reciprocal of the width of this frequency band.

These parameters K1 and K2 are therefore digital approximations of the energy of the acceleration signal in each of the two bands cited above.

The energy present in a signal line is the Fourier transform of the signal calculated for a period T of analysis of the signal.

The calculation of this Fourier transform would require the storage of all the samples acquired during the period T, together with a large number of multiplications and additions, which could not be economically executed in real time, particularly with an 8-bit microcontroller, even using fast algorithms such as the fast Fourier transform.

The method proposed for determining the energy of the acceleration signal is particularly simple and can be implemented in a low-power microprocessor.

In particular, it does not require the storage of the sampled signals.

Equally, it does not require any multiplication, and uses only addition and calculation of reciprocals.

The fact that it uses the absolute norm instead of the Euclidean norm to determine the energy of the signal also helps to simplify the calculations.

Having determined the two parameters K1 and K2, the microcontroller 4 determines the ratio between the energies of the two bandwidths.

It then compares the ratio K1/K2 obtained in this way to a threshold value. If the ratio K1/K2 is greater than this threshold value, the resonance of the mode which is to be detected is present and the tire is running on its insert. The microcontroller 4 then generates a warning signal to be sent to the driver, via the interface 7.

The detection threshold with which the ratio K1/K2 is compared is ⅓, for example.

It will be noted that the detection carried out in this way is not affected by the level of excitation of the ground, since the ratio K1/K2 is a parameter independent of the background noise.

Clearly, other modes of implementing the method proposed by the invention can be envisaged. In particular, the digital calculation executed by the low-power microprocessor can be partially or entirely replaced by an analog method executed at the sampling rate of the vibration signal. This makes it possible to increase this frequency in order to improve the performance of the detector in terms of the range of analysis, the accuracy of the clock signal generated, etc.

Equally, the method can be implemented in an application-specific integrated circuit, which may if necessary incorporate the vibration signal measurement sensor and leave the microcontroller responsible simply for the warning triggering strategy. This solution offers the advantage of optimal compactness and low cost for mass production.

What is claimed is:

1. A method for analyzing vibration signals generated by the running of a tire on a safety insert, to detect a mode of resonance generated by this running, comprising:

measuring a vibration signal generated by the running of the tire on the safety insert, within a given frequency band;

determining the energy of the detected vibration signal in first and second frequency bands, the first frequency band being narrow and the second frequency band being wide, the first and second frequency bands being centered on the same line of the mode of resonance; and comparing the ratio of the energies in the first and second frequency bands with a warning threshold.

2. The method of claim 1, comprising determining the energy of the detected vibration signal in said first and second frequency bands by mixing the detected vibration signal with two periodic signals which are in phase quadrature and whose frequency corresponds to the frequency of said mode of resonance.

3. The method of claim 2, comprising determining the energy of the vibration signal in said first and second frequency bands by determining a norm of a vector whose two coordinates correspond to the detected vibration signal mixed with two periodic signals which are in phase quadrature and are integrated during a period equal to twice the reciprocal of the width of the given frequency band.

4. The method of claim 3, comprising determining the norm by summing the absolute values of the coordinates.

5. The method of claim 2, wherein said two periodic signals are eh square-wave signals which are at a first level during one half-period and at an opposite level during the following half-period.

6. The method of claim 5, further comprising sampling and digitizing the detected vibration signal and then multiplying the resulting signal with each of said square-wave signals in phase quadrature, each square wave signal having a frequency corresponding to the frequency of said mode of resonance and having the value 1 during one half-period and −1 during the following half-period.

7. A system for analyzing vibration signals generated by the running of a tire on a safety insert, comprising:

a sensor for measuring a vibration signal generated by the running of the tire on the safety insert in a given frequency band; and means for processing the detected vibration signal and detecting a mode of resonance generated by the running of the tire, said processing means;

determining the energy of the detected vibration signal in first and second frequency bands, the first frequency band being narrow and the second frequency band being wide, the first and second frequency bands being centered on the same line of the mode of resonance; and comparing the ratio of energies in the first and second frequency bands with a warning threshold.

8. The system of claim 7, wherein said processing means include an 8-bit microcontroller.

9. The system of claim 7, wherein said processing means include analog means.

10. The system of claim 7, wherein said processing means include an application-specific integrated circuit.

11. The system of claim 7, wherein said processing means determines the energy of the detected vibration signal by mixing the detected vibration signal with two periodic signals which are in phase quadrature and whose frequency corresponds to the frequency of said mode of resonance.

12. The system of claim 11, wherein the processing means determines the energy of the detected vibration signal in said first and second frequency bands by determining a norm of a vector whose two coordinates correspond to the detected vibration signal mixed with two periodic signals which are in phase quadrature and are integrated during a period equal to twice the reciprocal of the width of the given frequency band.

13. The system of claim 12, wherein said processing means determines the norm by summing the absolute values of the coordinates.

14. The system of claim 12, wherein the sensor is an accelerometer.

15. The system of claim 11, wherein said periodic signals are square-wave signals which are at a first level during one half-period and at an opposite level during the following half-period.

16. The system of claim 15, wherein said processing means samples and digitizes the detected vibration signal and then multiplies the signal with each of said square-wave signals in phase quadrature, each square wave signal having a frequency corresponding to the frequency of said mode of resonance and having the value 1 during one half-period and −1 during the following half-period.

17. A processor for analyzing vibration signals generated by the running of a tire on a safety insert to detect a mode of resonance generated by the running, the vibration signals being detected by a sensor, the processor:

determining the energy of a detected vibration signal in first and second frequency bands, the first frequency band being narrow and the second frequency band being wide, the first and second frequency bands being centered on the same line of the mode of resonance; and comparing the ratio of the energies in the first and second frequency bands with a warning threshold.

18. The processor of claim 17, including an 8-bit microcontroller.

19. The processor of claim 17, including analog means.

20. The processor of claim 17, including an application-specific integrated circuit.

21. The processor of claim 17, wherein said processor determines the energy of the detected vibration signal in the first and second frequency bands by mixing the detected vibration signal with two periodic signals which are in phase quadrature and whose frequency corresponds to the frequency of said mode of resonance.

22. The system of claim 21, wherein the processor determines the energy of the detected vibration signal in said first and second frequency bands by determining a norm of a vector whose two coordinates correspond to the measured signal mixed with two periodic signals which are in phase quadrature and are integrated during a period equal to twice the reciprocal of the width of the frequency band.

23. The processor of claim 22, wherein said processor determines the norm by summing the absolute values of the coordinates.

24. The processor of claim 21, wherein said periodic signals are square-wave signals which are at a first level during one half-period and at an opposite level during the following half-period.

25. The processor of claim 24, wherein said processor samples and digitizes the detected vibration signal and then multiplies the signal with each of said square-wave signals in phase quadrature, the square wave signals each having a frequency corresponding to the frequency of said mode of resonance and having the value 1 during one half-period and −1 during the following half-period.

* * * * *

UNITED STATES PATENT AND TRADEMARK OFFICE
CERTIFICATE OF CORRECTION

PATENT NO. : 6,253,616 B1
DATED : July 3, 2001
INVENTOR(S) : Alfred Permuy and Laurent Breneol It is certified that error appears in the above-identified patent and that said Letters Patent is hereby corrected as shown below:

<u>Column 5, claim 5,</u>
Line 22, " eh " should read -- each --.

Signed and Sealed this

Twenty-sixth Day of March, 2002

Attest:

JAMES E. ROGAN
*Attesting Officer*          *Director of the United States Patent and Trademark Office*